United States Patent
Zhang et al.

(10) Patent No.: US 11,438,492 B2
(45) Date of Patent: Sep. 6, 2022

(54) CHARACTERIZING OPTICAL CHARACTERISTICS OF OPTICAL ELEMENTS

(71) Applicant: Pony AI Inc., Grand Cayman (KY)

(72) Inventors: Yubo Zhang, Los Gatos, CA (US); Xiang Yu, Santa Clara, CA (US); Tiancheng Lou, Milpitas, CA (US); Jun Peng, Fremont, CA (US); Kai Chen, San Jose, CA (US); Yiming Liu, Mountain View, CA (US); Sinan Xiao, Mountain View, CA (US); Tianyi Li, Milpitas, CA (US); Yin Zhong, Sunnyvale, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/890,602

(22) Filed: Jun. 2, 2020

(65) Prior Publication Data

US 2020/0336641 A1 Oct. 22, 2020

Related U.S. Application Data

(63) Continuation of application No. 16/005,590, filed on Jun. 11, 2018, now Pat. No. 10,715,705.

(51) Int. Cl.
| | |
|---|---|
| *H04N 5/225* | (2006.01) |
| *H04N 5/232* | (2006.01) |
| *G06T 7/557* | (2017.01) |
| *G06T 7/80* | (2017.01) |

(52) U.S. Cl.
CPC .......... *H04N 5/2254* (2013.01); *G06T 7/557* (2017.01); *G06T 7/80* (2017.01); *H04N 5/2259* (2013.01); *H04N 5/232* (2013.01); *H04N 5/23229* (2013.01); *H04N 5/23293* (2013.01); *G06T 2207/30108* (2013.01); *G06T 2207/30244* (2013.01)

(58) Field of Classification Search
CPC .................................................. H04N 5/2254
USPC ........................................................ 348/241
See application file for complete search history.

(56) References Cited

U.S. PATENT DOCUMENTS

| | | | |
|---|---|---|---|
| 4,894,754 A | 1/1990 | Levilain | |
| 7,746,534 B2 | 6/2010 | Tonar et al. | |
| 7,751,645 B2 | 7/2010 | Reneker et al. | |
| 10,074,183 B1* | 9/2018 | Watson | ................ B64C 39/024 |
| 2002/0118464 A1 | 8/2002 | Nishioka et al. | |
| 2014/0320702 A1* | 10/2014 | Tsubusaki | .......... H04N 5/23219 348/240.3 |

(Continued)

*Primary Examiner* — Yulin Sun
(74) *Attorney, Agent, or Firm* — Sheppard Mullin

(57) ABSTRACT

Systems, methods, and non-transitory computer readable media may be configured to characterize optical characteristics of optical elements. An optical element mount may be configured to carry an optical element. A calibration display may be configured to display a calibration object. The calibration object may include a known visual pattern. Multiple images of the calibration object may be obtained. The multiple images may be acquired using the optical element carried by the optical element mount. The multiple images may include different perspectives of the calibration object. Optical characteristics of the optical element may be characterized based on the known visual pattern and the different perspectives of the calibration object.

20 Claims, 6 Drawing Sheets

(56) References Cited

U.S. PATENT DOCUMENTS

| | | | |
|---|---|---|---|
| 2015/0109479 A1* | 4/2015 | Kimoto | H04N 5/232127 |
| | | | 348/231.99 |
| 2015/0212294 A1 | 7/2015 | Imamura | |
| 2016/0246041 A1 | 8/2016 | Rappel | |
| 2017/0159875 A1* | 6/2017 | Wagner | G03B 17/563 |
| 2018/0303574 A1* | 10/2018 | Ramirez Luna | G03B 35/08 |

* cited by examiner

CHARACTERIZING OPTICAL CHARACTERISTICS OF OPTICAL ELEMENTS

CROSS-REFERENCE TO RELATED APPLICATION

This application is a continuation of U.S. application Ser. No. 16/005,590 filed Jun. 11, 2018, the content of which is incorporated herein by reference in its entirety.

FIELD OF THE INVENTION

This disclosure relates to approaches for characterizing optical characteristics of optical elements.

BACKGROUND

Optical elements (e.g., lenses, mirrors, prisms) used to acquire images/videos may have optical imperfections, such as optical aberrations and optical distortions. Such imperfections may distort provision of light by the optical elements to image sensors and cause imperfections in images/videos acquired using the optical elements. Optical elements must be characterized and calibrated to remove/reduce the impact of optical imperfections on image/video acquisition.

SUMMARY

Various embodiments of the present disclosure may include systems, methods, and non-transitory computer readable media configured to characterize optical characteristics of optical elements. An optical element mount may be configured to carry an optical element. A calibration display may be configured to display a calibration object. The calibration object may include a known visual pattern. Multiple images of the calibration object may be obtained. The multiple images may be acquired using the optical element carried by the optical element mount. The multiple images may include different perspectives of the calibration object. Optical characteristics of the optical element may be characterized based on the known visual pattern and the different perspectives of the calibration object.

In some embodiments, the optical element includes a lens, and the optical characteristics may include a curvature of the lens and imperfections in the curvature of the lens.

In some embodiments, an image sensor mount may be configured to carry an image sensor. The image sensor may be calibrated based on the optical characteristics of the optical element. The calibration of the image sensor may compensate for distortion of light traveling through the optical element due to the optical characteristics of the optical element.

In some embodiments, at least one of the optical element mount and the image sensor mount may be movable with respect to the other.

In some embodiments, the multiple images including the different perspectives of the calibration object may be acquired based on movement of the optical element mount with respect to the calibration object. The multiple image may be acquired based on: movement of the optical element mount into different poses; detection of whether the calibration object is visible to the image sensor at the different poses based on recognition of the known visual pattern; detection of whether the optical element mount is stable at the different poses; and acquisition of the multiple images based on the calibration object being visible to the image sensor and the optical element being stable at the different poses.

In some embodiments, the multiple images may be classified based on similarity of the different poses.

In some embodiments, the calibration display may include a light field display, and the multiple images including the different perspectives of the calibration object may be acquired based on changes in angles or depths of the calibration object displayed by the light field display.

In some embodiments, optical characteristics of the optical element that are characterized may be limited to a portion of the optical element.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
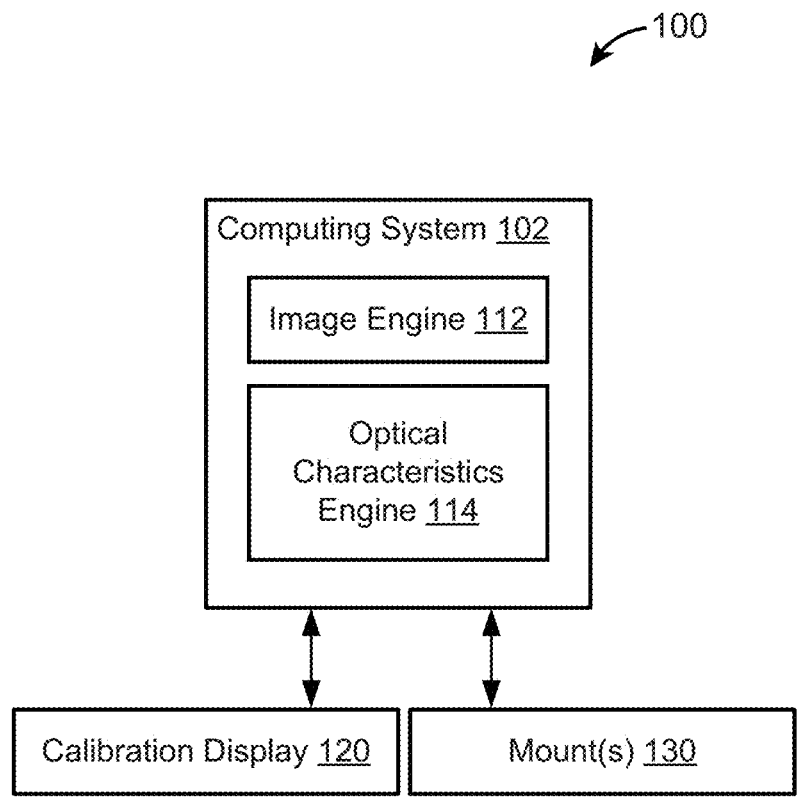
FIG. 1 illustrates an example environment for characterizing optical characteristics of optical elements, in accordance with various embodiments.

In various implementations, an optical element mount may be configured to carry an optical element. A calibration display may be configured to display a calibration object. The calibration object may include a known visual pattern. Multiple images of the calibration object may be obtained. The multiple images may be acquired using the optical element carried by the optical element mount. The multiple images may include different perspectives of the calibration object. Optical characteristics of the optical element may be characterized based on the known visual pattern and the different perspectives of the calibration object.

The optical element may include a lens, a mirror, a prism, and/or other optical element. The optical characteristics may include a curvature, shape, and/or other characteristics of the optical element and imperfections in the optical element. For example, the optical element may include a lens and the optical characteristics may include a curvature of the lens and imperfections in the curvature of the lens.

In some embodiments, an image sensor mount may be configured to carry an image sensor. The image sensor may be calibrated based on the optical characteristics of the optical element. The calibration of the image sensor may compensate for distortion of light traveling through the optical element due to the optical characteristics of the optical element. In some embodiments, one or both of the optical element mount and the image sensor mount may be movable with respect to the other.

In some embodiments, the multiple images including the different perspectives of the calibration object may be acquired based on movement of the optical element mount with respect to the calibration object. The multiple image may be acquired based on: movement of the optical element mount into different poses; detection of whether the calibration object is visible to the image sensor at the different poses based on recognition of the known visual pattern; detection of whether the optical element mount is stable at the different poses; and acquisition of the multiple images based on the calibration object being visible to the image sensor and the optical element being stable at the different poses.

In some embodiments, the multiple images may be classified based on similarity of the different poses.

In some embodiments, the calibration display may include a light field display, and the multiple images including the different perspectives of the calibration object may be acquired based on changes in angles or depths of the calibration object displayed by the light field display.

In some embodiments, optical characteristics of the optical element that are characterized may be limited to a portion of the optical element.

The approaches disclosed herein provides for automatic characterization and/or calibration for optical elements/image capture devices. Such automatic characterization and/or calibration of optical elements/image capture devices may provide for improved image/video acquisition and/or improved visual analysis using acquired images/videos. For example, optical curvature/imperfections in lenses used to detect objects may result in inaccurate object detection. Inaccurate object detection may result in improper operations. For instance, object detection may be used to automatically operate a machine (e.g., autonomous vehicle). Inaccurate object detection may result in the machine operating based on inaccurate information (e.g., autonomous vehicle making undesired vehicle maneuver based on false vehicle/person/traffic signal detection). The automatic characterization and/or calibration disclosed herein improves acquisition of images/videos and improves the use of acquired images/videos, such as in object detection.

FIG. 1 illustrates an example environment 100 for characterizing optical characteristics of optical elements, in accordance with various embodiments. The example environment 100 may include a computing system 102, a calibration display 120, and one or more mount(s) 130. The computing system 102 may be communicatively, electrically, and/or mechanically coupled to the calibration display 120 and the mount(s) 130. The coupling between the different components within the environment 100 may include direct coupling and/or indirect coupling. While components 102, 120, 130 are shown in FIG. 1 as single entities, this is merely for ease of reference and is not meant to be limiting. For example, one or more components/functionalities of the computing system 102 described herein may be implemented, in whole or in part, within a single computing device or within multiple computing devices. the mount(s) 130 may include a single tool or multiple tools working together to provide mounting capabilities. The calibration display 120 may include a single display component (e.g., monitor, projector) and/or multiple display components (e.g., multiple monitors).

An optical element may refer to instrument(s), tool(s), and/or medium that acts upon light passing through/reflecting against the instrument(s)/tool(s)/medium. An optical element may affect direction, deviation, and/or path of the light passing through/reflecting against the optical element. For example, an optical element may include one or more of lens, mirror, prism, and/or other optical element. An optical element may guide light passing through/reflecting against the optical element to one or more image sensors. For example, an optical element may be physically arranged with respect to an image sensor to provide light gathered by the optical element to the image sensor. The image sensor may used the light guided thereto by the optical element to acquire images and/or videos. For instance, an image capture device (e.g., camera) may include a housing that carries an optical element and an image sensor, such as a charge-coupled device sensor, an active pixel sensor, a complementary metal-oxide semiconductor sensor, an N-type metal-oxide-semiconductor sensor, and/or other image sensor. The image sensor of the image capture device may acquire images and/or videos based on light guided to the image sensor (light that becomes incident thereon) by the optical element.

An optical element's guiding of light (to an image sensor) may be affected by the optical characteristics of the optical element. The optical characteristics of the optical element may refer to physical characteristics of the optical element that affects how the optical element acts upon light passing through/reflecting against the optical element. The optical characteristics of the optical element may refer to outer shape of the optical element, internal structure of the optical element, material(s) that makeup the optical element, and/or other optical characteristics of the optical element. The optical characteristics of the optical element may refer parameters that define how the optical element affects lights, such as focal length, aperture, modulation transfer function, aberrations, surface quality, and/or other parameters. For example, the optical element may include a lens, and the optical characteristics may include a curvature of the lens and/or imperfections in the curvature of the lens. The curvature of the lens and/or the imperfects in the curvature of the lens may affect how the lens acts upon light passing through the lens. Optical characteristics of an optical element may result in acquisition of images/videos that do not accurately represent the captured scene(s). For example, curvature and/or imperfections in curvatures of a lens may result in images acquired using the lens to include warping of one or more shapes within the captured scene(s).

The calibration display 120 may refer to a tool used to visually display information. The calibration display 120 may display visual information itself (e.g., monitor) and/or may display visual information using a projecting surface (e.g., projector). The visual information displayed by the calibration display 120 may be static (not changing over time) and/or dynamic (changing over times). The visual information displayed by the calibration display 120 may include two-dimensional visual information (two-dimensional object) and/or three-dimensional visual information (three-dimensional object).

The calibration display 120 may be configured to display one or more calibration objects and/or other information. A calibration object may refer to an object with known visual characteristics (e.g., shape, size, pattern). For example, a calibration object may include an object with a known visual pattern. The known visual pattern may include a pattern designs with known configuration. The visual characteristics of the calibration object must be precise as deformations in the calibration object may lead to inaccurate optical element calibration. The calibration display 120 may display a calibration object on a flat surface (e.g., flat display panel, flat projecting surface) to ensure, for example, precise shape of the calibration object. The use of the calibration display 120 to present calibration object(s) provides flexibility in changing calibration objects. For instance, the pattern of calibration object displayed by the calibration display 120 may be changed by changing the image/model of the calibration object. Such display of calibration objects is less costly than manufacturing physical calibration objects with high precision.

For example, a checkered pattern image may be used to characterize optical characteristics, such as optical aberration and distortions, of a lens/image capture device (e.g., camera). In some embodiments, the calibration display 120 may utilize a large and/or flat format display to provide the calibration object, such as a checkered pattern image, to ensure accurate characterization of the optical element.

In some embodiments, the calibration display 120 may include one or more light field displays. A light field display may be able to display calibration objects using different angles and/or depths. For example, a light field display may simulate a checkered pattern image at different depths and/or different angles. That is, a light field display may display a virtual checkered pattern image to simulate how a physical checkered pattern object would look at different distances and/or with different perspectives. Such use of light field display may remove the need for mount(s) 130 that are movable, such as a mount that is connected to a movable electro-mechanical arm, and may allow for characterization of optical elements in smaller amount of space.

The mount(s) 130 may refer to one or more mounts used to position optical element(s), image sensor(s), and/or image capture device(s) with respect to the calibration object displayed by the calibration display 120. A mount may refer to a support for optical element(s), image sensor(s), and/or image capture device(s). A mount may carry (attach to, support, hold, and/or otherwise carry) an (e.g., optical element, image sensor, image capture device). A mount may passively and/or actively carry an object in place. For example, a mount may provide a space within which an optical element may be stably placed. As another example, a mount may include one or more mechanisms, such as a grip, a clasp, and/or a suction, to actively hold an optical element in place.

The mount(s) 130 may include a single mount or multiple mounts. For example, the mount(s) 130 may include an image capture device mount configured to carry an image capture device (including an optical element and an image sensor) in place. An image capture device mount may be used to position the image capture device with respect to the calibration object displayed by the calibration display 120. As another example, the mount(s) 130 may include an optical element mount configured to carry an optical element and an image sensor mount configured to carry an image sensor. An optical element and an image sensor may be mechanically aligned (e.g., within an image capture device, by using an optical element mount and/or an image sensor mount) to characterize and/or calibrate the optical characteristics of the optical element. Other configuration of mount (s) are contemplated.

In some embodiments, the optical element mount and/or the image sensor mount may be movable with respect to the other. Movement of the optical element mount and/or the image sensor mount may include translational movement (e.g., translation in X, Y, Z direction) and/or rotational movement (e.g., rotation about X, Y, Z axis). Movement of the optical element mount and/or the image sensor mount may provide for change in how the optical element and the image sensor are configured/positions with respect to either other. That is, movement of the optical element mount and/or the image sensor mount may be used to change how the optical element and the image sensor are mechanically aligned. The mechanical alignment of the optical element and the image sensor may determine which portion(s) of the optical element are used to guide light to the image sensor. For instance, the optical element mount and/or the image sensor mount may be moved to change the distance between the optical element and the image sensor and/or the angle by which the optical element is positioned with respect to the image sensor. The distance and/or the angle between the optical element and the image sensor may determine whether the entire optical element is used to guide light to the image sensor or only certain portion(s) of the optical element are used to guide light to the image sensor. The distance and/or the angle between the optical element and the image sensor may determine how the light guided by the optical element reaches the image sensor. The orientation of the optical element to the image sensor (e.g., distance and/or the angle between the optical element and the image sensor) may determine which characteristics of the optical element are relevant for acquiring images/videos and/or how the characteristics of the optical element may affect the optical element's guiding of light to the image sensor. The optical element mount and/or the image sensor mount may be moved to characterize just the portion(s) of the optical element that will be used to acquire images/videos. Resource savings (consumption of less cost, less time, less power, less memory usage) may be achieved by characterizing relevant portion(s) of the optical element, rather than characterize the entire optical element.

In some embodiments, the mount(s) 133 may be carried by and/or be part of a movable electro-mechanical arm. The electro-mechanical arm may move the mount(s) 130 with respect to the calibration object displayed by the calibration display 120 to facilitate acquisition of the calibration object from different perspectives/poses. That is, the electro-mechanical arm may move the mount(s) 130 to change the orientation (distance, angle) of the mount(s) 130, the optical element, the image sensor, and/or the image capture device with respect to the calibration object.

Images/videos of the calibration object acquired from different perspectives/poses (e.g., busing movable arm and/or light field display) may provide additional data points compared to acquiring the calibration object from a single perspective/pose. The additional data point may be used to enhance characterization of the optical element. The images/videos of the calibration object acquired from different perspectives/poses may be compared as the images/videos are acquired and/or may be stored for later comparison.

The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include an image engine 112, an optical characteristics engine 114, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the image engine 112 may be configured to obtain multiple images of a calibration object. Obtaining an image may include accessing, acquiring, analyzing, determining, examining, identifying, loading, locating, opening, receiving, retrieving, reviewing, storing, and/or otherwise obtaining the image. An image may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network, electronic storage of an image sensor and/or an image capture device). The image engine 112 may obtain an image from a software component and/or a hardware component. The image engine 112 may obtain image of the calibration object as the images are acquired and/or after the acquisition of the images.

The multiple images obtained by the image engine 112 may be acquired using an optical element carried by the mount(s) 130. For example, the multiple images obtained by the image engine 112 may be acquired using an optical element of an image capture device carried by an image capture device mount (acting as both an optical sensor mount and an image sensor mount), or the multiple images obtained by the image engine 112 may be acquired using an optical element carried by an optical element mount which is separate from an image sensor mount.

The multiple images may include different perspectives of the calibration object. That is, the multiple images may provide different views of the calibration object. In some embodiments, the multiple images including different perspectives of the calibration object may be acquired based on movement of the mount(s) 150 with respect to the calibration object. For example, the multiple image may be acquired by moving the mount(s) 150 into different poses with respect to the calibration object. At the different poses, whether the calibration object is visible to the image sensor may be detected based on recognition of the known visual characteristic(s) of the calibration object. For example, the pattern of the calibration object may be known and whether the calibration object is visible to the image sensor may be detected based on whether the entire pattern of the calibration object is recognized to be included within the light guided to the image sensor by the optical element (e.g., within the field of view of the optical element). The stability of the optical element may also be detected. That is, whether the optical element mount is stable at the different poses may be detected, such as based on motion sensor readings (e.g., outputs of accelerometer, gyroscope, inertial measurement unit) and/or based on image analysis to detect motion blur. Based on the calibration object being visible to the image sensor and the optical element being stable at the different poses, the multiple images of the calibration object may be acquired at the different poses.

In some embodiments, the multiple images including different perspectives of the calibration object may be acquired based on changes in angles and/or depths of the calibration object displayed by a light field display. That is, the multiple images may be acquired with a stationary optical element/image capture device, and the different perspectives of the calibration object may be provided by the light field display simulating the calibration object at different depths and/or different angles In some embodiments, the multiple images may be classified based on similarity of the different perspectives/poses. For example, images that provide a similar perspective of the calibration object and/or images that are captured from a similar pose may be grouped together. The images within the different groups may be analyzed to determine which image will be used to characterize optical characteristics of the optical elements. For example, only a certain number of images in each group with highest sharpness/best focus may be selected/retained as images to characterize the optical characteristics of the optical element.

In various embodiments, the optical characteristics engine 114 may be configured characterize one or more optical characteristics of the optical element. The optical characteristics engine 114 may characterize optical characteristic(s) of the optical element based on one or more known visual characteristics of the calibration object, the different perspectives of the calibration object provided by the multiples images (obtained by the image engine 112), and/or other information. For example, the optical characteristics engine 114 may characterize optical characteristics (e.g., curvature, imperfections in curvature) of a lens based on the known visual pattern of the of the calibration object and the different perspectives of the calibration object (different perspectives of the known visual pattern) within the multiple images. The multiple images may be compared to each other and/or to the known visual pattern of the calibration object to characterize the optical characteristics of the lens. For instance, the optical characteristics engine 114 may use information on how the calibration object is acquired within the images to determine the curvature of the lens. The optical characteristics engine 112 may use information on deviations of how the calibration object is acquired within the images, such as warping/blurring of the known visual pattern within the images, at different poses (distances, angels) to determine imperfection in the curvature of the lens. In some embodiments, the characterization of optical characteristics may include estimation of parameters (e.g., intrinsic parameters, extrinsic parameters, distortion coefficients) of an image capture device/image sensor-optical element configuration and/or light distortion parameters of the optical element. Characterizations of other optical characteristics (e.g., focal length, aperture, modulation transfer function, aberrations, surface quality) and other optical elements are contemplated.

In some embodiments, optical characteristics of the optical element that are characterized by the optical characteristics engine 114 may be limited to one or more portions of the optical element. That is, rather than characterizing the entire optical element, only those portions of the optical element that are relevant (e.g., will be used in image/video acquisition) may be characterized. A portion of an optical element may refer to a surface portion and/or an internal portion of the optical element. A portion of an optical element that is characterized may be characterized with respect to a particular orientation (e.g., distance, angle) with respect to an image sensor. For example, it may be expected for an optical element in a particular configuration with an image sensor. The particular configuration of the optical element with the image sensor may result in only a small portion (surface, volume) of the optical element being used to guide light to the image sensor and/or only a small portion of the light guided to the image sensor being used. The particular configuration of the optical element with the image sensor may result in a particular angle of light from optical element being guided to the image sensor. The optical characteristics engine 114 may receive information identifying the portion(s) of the optical element that will be used to acquire images and may characterize just the identified portions. Such characterization of portion(s) of the optical element may provide for resource savings.

In some embodiments, the image sensor and/or the optical element may be calibrated based on the optical characteristics of the optical element. The calibration of the image sensor and/or the optical element may compensate for distortion of light traveling through/reflecting against the optical element due to the optical characteristics of the optical element. For example, the optical characteristics of the optical element may be used to compensate for images acquired using the optical element to adjust for aberration and/or distortion in images caused by the optical element. The optical characteristics of the optical element may be used to determine information about objects within images (e.g., measuring shape and/or size of an object in an image), to determine the location of the optical element/image capture device within a scene, and/or to perform a three-dimensional reconstruction of a scene. Other uses of optical characteristics of optical elements are contemplated.

Figure 2:
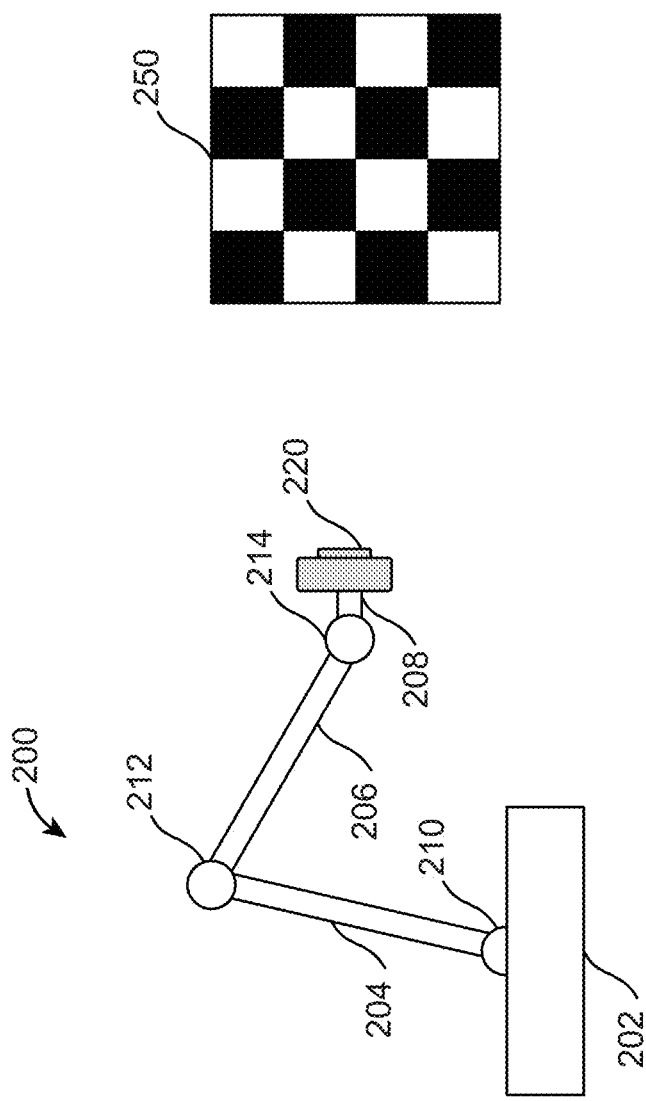
FIG. 2 illustrates an example movable arm and an example calibration object, in accordance with various embodiments.

FIG. 2 illustrates an example movable arm 200 and an example calibration object 250, in accordance with various embodiments. The calibration object 250 may have one or more known visual characteristics. For example, the calibration object 250 may include a checkered pattern image, and the size and dimension of the checkered pattern may be known. A image capture device 250 (including an optical element and an image sensor) may be mounted on a mount 208. Alternatively, an optical element and an image sensor may be mounted on the mount 208. Multiple images of the calibration object 250 acquired using the optical element may be used to characterize optical characteristics of the optical element. The multiple images may include different perspectives of the calibration object 250.

The multiple images including different perspectives of the calibration object 250 may be acquired based on movement of the mount 208 with respect to the calibration object 250. For example, the multiple image may be acquired by moving the mount 208 into different poses with respect to the calibration object 250. The mount 208 may be moved via operation of the movable arm 200. The movable arm may include a base 202, a lower arm 204, and an upper arm 204. The lower arm may be movable attached to the base 202 via a hinge 210, and the upper arm may be movable attached to the lower arm via a hinge 212. The mount 208 may be movably attached to the upper arm 216 via a hinge 214. The arms 204, 206, and the hinges 210, 212, 214 of the movable arm 200 may be used to change the orientation (distance, angle) of the mount 208 carrying the image capture device 220 (or an optical element and an image sensor) with respect to the calibration object 250. The arms 204, 206, and the hinges 210, 212, 214 of the movable arm 200 may facilitate translational movement translation in X, Y, Z direction) and/or rotational movement (e.g., rotation about X, Y, Z axis) of the mount 208 with respect to the calibration object 250. The movement arm 200 may include and/or be coupled with a computing device (including processor(s) and memory) that control the movement of the movement arm 200. Other configurations of the movable arm 200 are contemplated.

Figure 3:
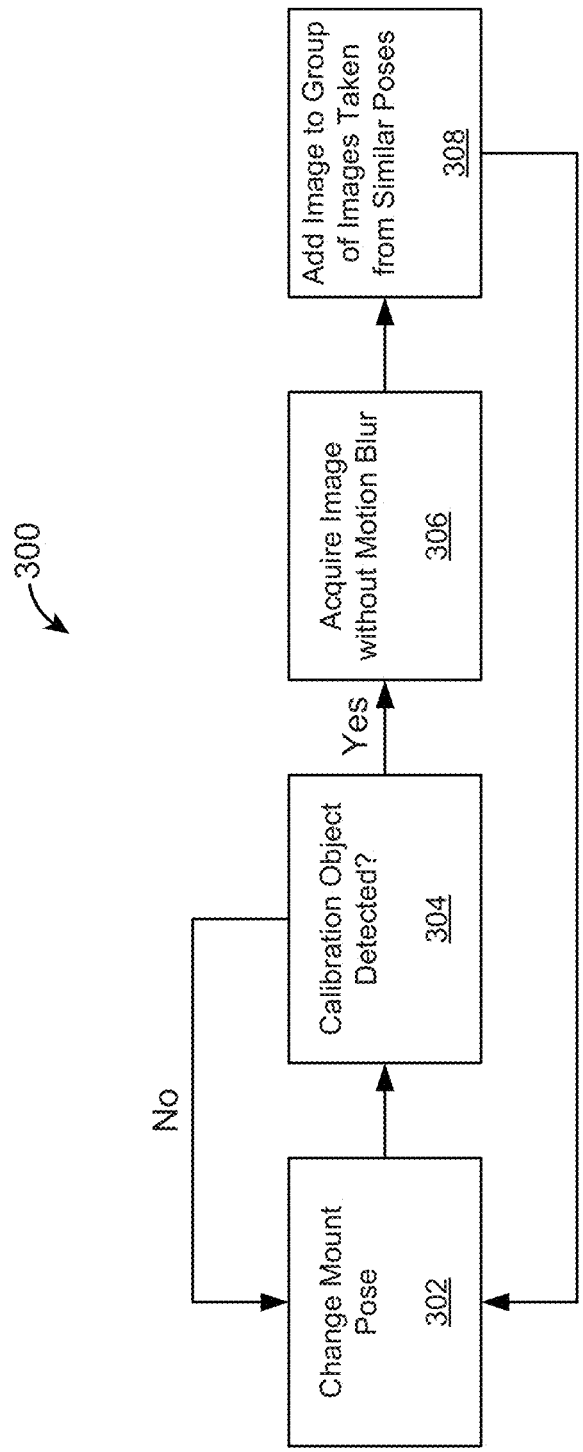
FIG. 3 illustrates an example flow for acquiring images of calibration object, in accordance with various embodiments.

FIG. 3 illustrates an example flow 300 for acquiring images of calibration object, in accordance with various embodiments. At step 302, the pose of a mount carrying an image capture device or an optical element may be changed. At step 304, whether or not a calibration object is detected within the field of view of the optical element may be detected. If the calibration object is not detected, step 302 may be repeated. If the calibration object is detected, an image without motion blur may be acquired at step 306. The image without motion blur may be acquired based on visual analysis of the image not indicating motion blur/shaking and/or based on the mount and/or the optical element being stable. At step 308, the acquired image may be added to a group of image taken from similar poses. A certain number of images in the group with highest sharpness/best focus may be selected/retained as images to characterize the optical characteristics of the optical element.

Figure 4C:
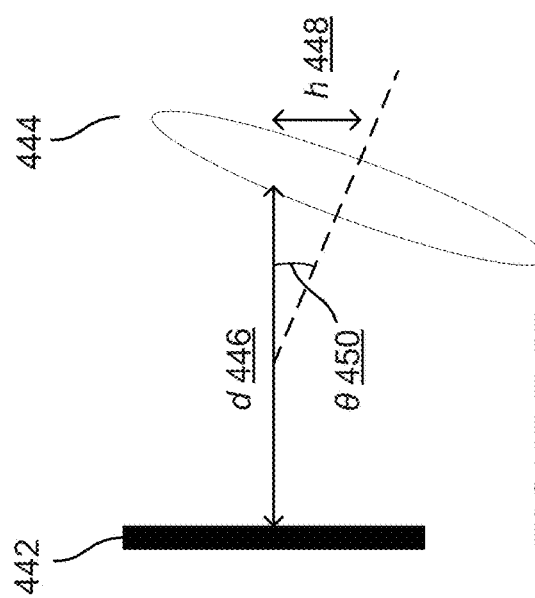
FIG. 4C illustrates example portions of optical elements, in accordance with various embodiments.
Figure 4B:
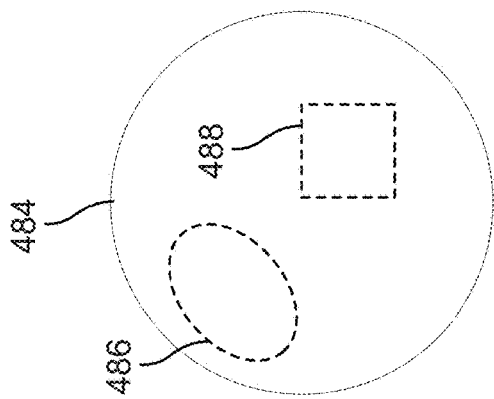
FIG. 4B illustrates an example configuration of an optical element with respect to an image sensor, in accordance with various embodiments.
Figure 4A:
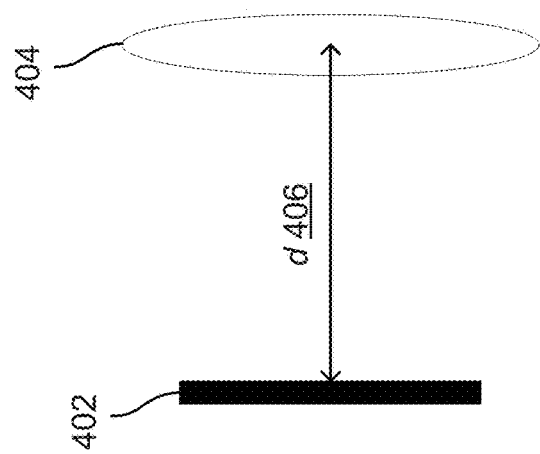
FIG. 4A illustrates an example configuration of an optical element with respect to an image sensor, in accordance with various embodiments.

FIGS. 4A-4B illustrate example configurations of optical elements 404, 444 with respect to image sensors 402, 442, in accordance with various embodiments. The optical elements 404, 444 may be positioned with respect to the image sensors 402, 442 based on movement of an optical element mount carrying the optical elements 404, 444 and/or movement of an image sensor mount carrying the image sensors 402, 442. Movement of the optical element mount and/or the image sensor mount may include translational movement (e.g., translation in X, Y, Z direction) and/or rotational movement (e.g., rotation about X, Y, Z axis).

Movement of the optical element mount and/or the image sensor mount may provide for change in how the optical elements 404, 444 and the image sensors 402, 442 are configured/positions with respect to either other. The orientation of the optical elements 404, 444 and the image sensors 402, 442 may determine which portion(s) of the optical elements 404, 444 are used to guide light to the image sensors 402, 442. The orientation of the optical elements 404, 444 and the image sensors 402, 442 may be changed to characterize different portions of the optical elements 404, 444.

For example, as shown in FIG. 4A, the optical element 404 may be placed directly in front of the image sensor 402 at a distance d 406. As another example, as shown in FIG. 4B, the optical element 444 may be shifted down from the image sensor 442 by a distance h 448, and may be tilted with respect to a center line of the image sensor 442 by an angle θ 450. Image(s) captured with the optical element 404 and the image sensor 402 positioned as shown in FIG. 4A may be used to characterize different portions of the optical element 404 than image(s) captured with the optical element 444 and the image sensor 442 positioned as shown in FIG. 4B. The orientation of an optical element and an image sensor may placed into different configurations, such as shown in FIGS. 4A-4B, based on which portions of the optical element are desired to be characterized. That is, the distance and/or the angle between the optical element and the image sensor may determine how the light guided by the optical element reaches the image sensor, and the orientation of optical element and image sensor may be changed to determine different optical characteristics/optical characteristics for different portions of the optical element.

For example, FIG. 4C illustrates example portions 486, 488 of an optical element 484. Other sizes and/or shapes of optical element portions for characterization are contemplated. Based on how the optical element 484 will be used (e.g., positioned with respect to an image sensor, placed within an image capture device), certain portions of the optical element 484 may be used for image/video acquisition. For example, based on one configuration of the optical element 484 to an image sensor, the portion 486 may be the portion of the optical element 484 that guides light to the image sensor. Based on another configuration of the optical element 484 to an image sensor, the portion 488 may be the portion of the optical element 484 that guides light to the image sensor. Based on identification of the portion(s) of the optical element 484 that will be used to guide light to the image sensor, the optical element 484 may be positioned with respect to the image sensor to obtain images, which may be used to characterize optical characteristics of the optical element 484 in the identified portion(s).

For example, a user may input one or more of the values (e.g., distance d 406, 446, distance h 448, angle θ 450) into a computing device configured to move an optical element mount carrying an optical element and/or an image sensor mount carrying an image sensor. The value(s) may manually be entered by the user and/or may be inputted based on the user providing one or more design files/specifications for use of the optical element with the image sensor. The optical element mount and/or the image sensor mount may automatically be moved based on the input value(s) to arrange the optical element and the image sensor in the configuration that will be used to acquire images/videos. Images of calibration object(s) may be acquired with the optical element and the image sensor in the configuration to characterize relevant portion(s) of the optical element.

Figure 5:
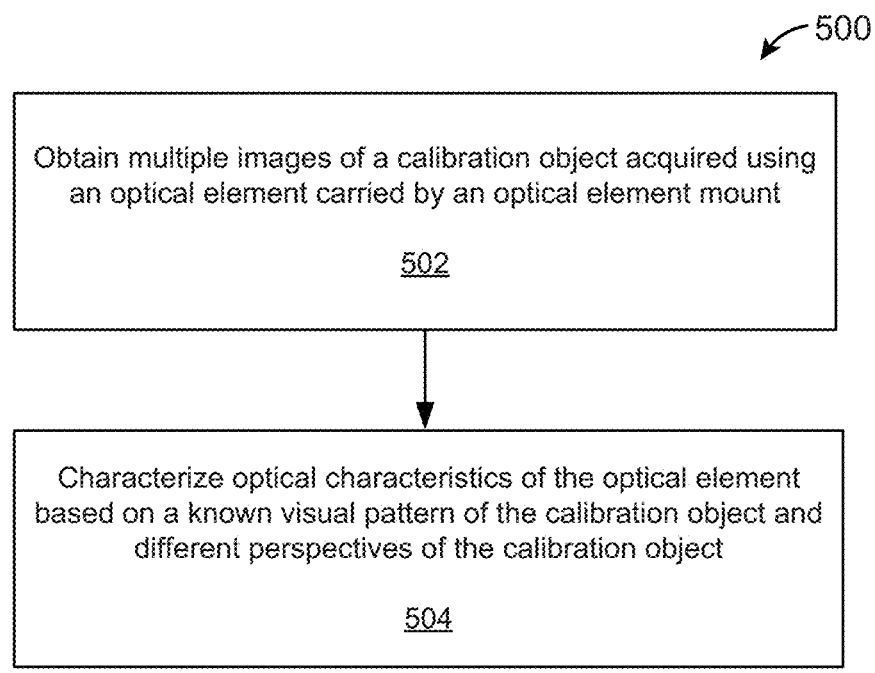
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, multiple images of a calibration object may be obtained. The multiple images may be captured using an optical element carried by an optical element mount. The multiple images may include different perspectives of the calibration object. The calibration object may be displayed by a calibration display. The calibration object may include a known visual pattern. At block 504, optical characteristics of the optical element may be characterized based on the known visual pattern of the calibration object and the different perspectives of the calibration object.

HARDWARE IMPLEMENTATION

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
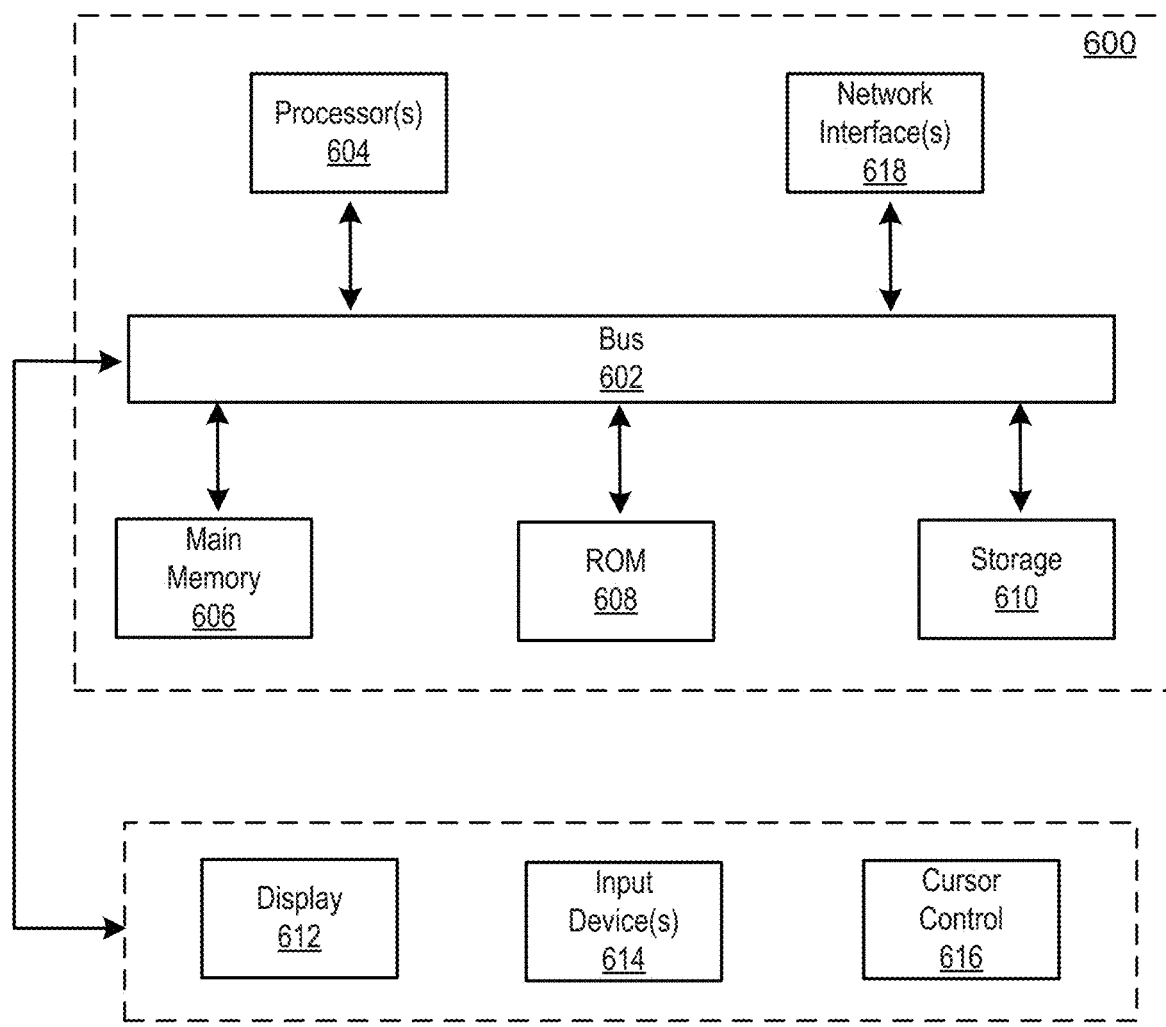
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
an optical element;
an image sensor;
one or more processors; and
a memory storing instructions that, when executed by the one or more processors, cause the system to perform:
   detecting whether an object is visible to the image sensor at different poses;
   determining a stability of an optical element based on sensor readings from an accelerometer or a gyroscope;
   in response to determining that the object is visible at the different poses and that the stability of the optical element satisfies a condition:
      obtaining, by the optical element, images including different depths or distances of an object;
      comparing the different depths or distances of the object to known image patterns of the object at the corresponding different depths or distances;
      characterizing optical characteristics of the optical element based on the comparison of the different depths or distances of the object; and
      calibrating the image sensor to adjust a distortion of the images, based on the characterized optical characteristics of the optical element; and
   in response to determining that the stability of the optical element fails to satisfy the condition, refraining from obtaining the images including different depths or distances of the object.

2. The system of claim 1, wherein the characterizing the optical characteristics comprises estimating any of an intrinsic parameter, an extrinsic parameters, or a distortion coefficient of the optical element.

3. The system of claim 1, wherein the characterizing the optical characteristics comprises characterizing any of focal length, an aperture, a modulation transfer function, or an aberration of the optical element.

4. The system of claim 1, wherein the characterizing the optical characteristics comprises limiting the characterizing to a portion of the optical element that guides light to the image sensor.

5. The system of claim 4, wherein the portion is based on an orientation of the optical element and an orientation of the image sensor.

6. The system of claim 1, wherein the obtaining the images including different depths or distances of the object comprises obtaining the images at different depths and angles of the object relative to the optical element.

7. The system of claim 1, wherein the obtaining the images including different depths or distances of the object comprises changing an angle and a distance between the image sensor and the optical element.

8. The system of claim 1, further comprising a mount that supports the image sensor or the optical element, the mount being movable to change an angle and a distance between the sensor and the optical element.

9. The system of claim 1, wherein the instructions further cause the system to perform:
   classifying the obtained images into groups based on respective depths or distances-of the obtained images; and
   selecting, for each of the groups, one image having a highest sharpness to characterize the optical characteristics of the optical element.

10. The system of claim 1, wherein the instructions further cause the system to perform:
   reconstructing a scene containing the object based on the characterized optical characteristics.

11. The system of claim 1, wherein the instructions further cause the system to perform:
   determining the stability of the optical element based on a measurement from an inertial measurement unit (IMU).

12. The system of claim 1, wherein the characterization of the optical characteristics comprises characterizing an aperture or a modulation transfer function of the optical element.

13. The system of claim 1, wherein the characterizing the optical characteristics comprises limiting the characterizing to a first portion of the optical element that guides light to the image sensor while refraining from characterizing a second portion of the optical element through which transmission of light is absent.

14. A method implemented by a computing system including one or more processors and storage media storing machine-readable instructions, wherein the method is performed using the one or more processors, the method comprising:
   detecting whether an object is visible to the image sensor at different poses;
   determining a stability of an optical element based on sensor readings from an accelerometer, a gyroscope, or an inertial measurement unit;
   in response to determining that the stability of the optical element satisfies a condition:
      obtaining, by the optical element, images including different depths or distances of an object;
      comparing the different depths or distances of the object to known image patterns of the object at the corresponding different depths or distances;
      characterizing optical characteristics of the optical element based on the comparison of the different depths or distances of the object; and
      calibrating the image sensor to adjust a distortion of the images, based on the characterized optical characteristics of the optical element; and
   in response to determining that the stability of the optical element fails to satisfy the condition, or that the object is invisible to the image sensor at the different poses, refraining from obtaining the images including different depths or distances of the object.

15. The method of claim 14, wherein the characterizing the optical characteristics comprises estimating any of an intrinsic parameter, an extrinsic parameters, or a distortion coefficient of the optical element.

16. The method of claim 14, wherein the characterizing the optical characteristics comprises characterizing any of focal length, an aperture, a modulation transfer function, or an aberration of the optical element.

17. The method of claim 14, wherein the characterizing the optical characteristics comprises limiting the characterizing to a portion of the optical element that guides light to the image sensor.

18. The method of claim 17, further comprising determining the portion based on an orientation of the optical element and an orientation of the image sensor.

19. The method of claim 14, wherein the obtaining the images including different depths or distances of the object comprises obtaining the images at different depths and angles of the object relative to the optical element.

20. A non-transitory computer readable medium comprising instructions that, when executed, cause one or more processors to perform:

detecting whether an object is visible to the image sensor at different poses;
determining a stability of an optical element based on sensor readings from an accelerometer, a gyroscope, or an inertial measurement unit;
in response to determining that the object is visible at the different poses and that the stability of the optical element satisfies a condition:
   obtaining, by the optical element, images including different depths or distances of an object;
   comparing the different depths or distances of the object to known image patterns of the object at the corresponding different depths or distances;
   characterizing optical characteristics of the optical element based on the comparison of the different depths or distances of the object; and
   calibrating the image sensor to adjust a distortion of the images, based on the characterized optical characteristics of the optical element; and
in response to determining that the stability of the optical element fails to satisfy the condition, refraining from obtaining the images including different depths or distances of the object.

* * * * *